United States Patent [19]

Hirayama

[11] Patent Number: 5,812,739
[45] Date of Patent: Sep. 22, 1998

[54] SPEECH RECOGNITION SYSTEM AND SPEECH RECOGNITION METHOD WITH REDUCED RESPONSE TIME FOR RECOGNITION

[75] Inventor: Hiroshi Hirayama, Tokyo, Japan

[73] Assignee: NEC Corporation, Tokyo, Japan

[21] Appl. No.: 530,995

[22] Filed: Sep. 20, 1995

[30] Foreign Application Priority Data

Sep. 20, 1994 [JP] Japan .................................. 6-224360

[51] Int. Cl.$^6$ ..................................................... G10L 3/02
[52] U.S. Cl. ........................ 395/2.47; 395/2.51; 395/2.49
[58] Field of Search .................. 395/2.47, 2.49, 395/2.4, 2.45, 2.53, 2.6, 2.61, 2.55, 2.59, 2.64, 2.65, 2.5, 2.3

[56] References Cited

U.S. PATENT DOCUMENTS

| | | | |
|---|---|---|---|
| 3,816,722 | 6/1974 | Sakoe et al. | 395/2.45 |
| 4,587,637 | 5/1986 | Ishizuka | 365/189.04 |
| 4,592,086 | 5/1986 | Watari et al. | 395/2.5 |
| 4,868,879 | 9/1989 | Morito | 395/2.57 |
| 4,910,783 | 3/1990 | Nakagawa | 395/2.5 |
| 5,121,465 | 6/1992 | Sakoe | 395/2.45 |
| 5,355,432 | 10/1994 | Tanaka | 395/2.43 |
| 5,577,162 | 11/1996 | Yamazaki | 395/2.41 |

FOREIGN PATENT DOCUMENTS 60-130799  7/1985  Japan ................................ G10L 3/00

OTHER PUBLICATIONS

H. Sakoe et al., "A High Speed DP–Matching Algorithm . . . Quantization", *Association of Electronic, Information and Communications Engineers of Japan*, vol. J71–D, No. 9, Sep. 1988, pp. 1650–1659.

S. Nakagawa, "Speech Recognition by Probability Model", *Association of Electronic, Information and Communications Engineers of Japan*, Jul. 1988, pp. 29–50.

T. Furui, "Digital Speech Processing", Tokai University Publishing Company, pp. 154–155.

Chapman & Hall, Holmes, "Speech synthesis and recognition", capter 7, pp. 102–128, especially p. 103 section 7.2 1988.

*Primary Examiner*—Allen R. MacDonald
*Assistant Examiner*—Richemond Dorvic
*Attorney, Agent, or Firm*—Sughrue, Mion, Zinn, Macpeak & Seas, PLLC

[57] ABSTRACT

A euclidean distance between an input pattern and a reference pattern is elementwise determined, to sequentially calculate a set of cumulative values thereof, which is stored in a work memory for use in a current recurrence calculation and in a cumulative data memory for use in a decision for a speech recognition. The recurrence calculation is executed on one of division blocks obtained by collecting input frames and reference frames. Stored data in the work memory are shifted every block for a subsequent recurrence calculation.

10 Claims, 5 Drawing Sheets

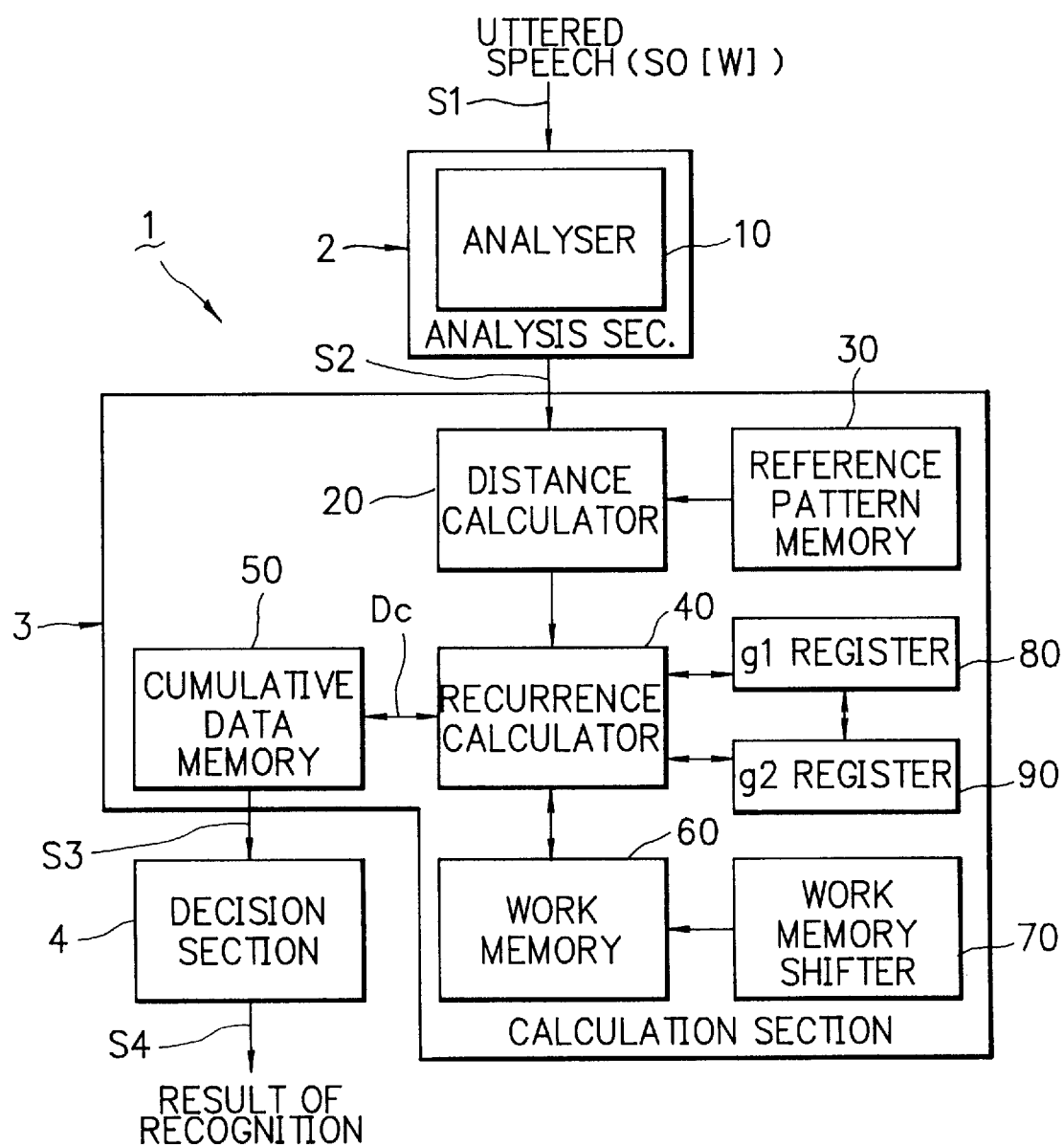

SPEECH RECOGNITION SYSTEM AND SPEECH RECOGNITION METHOD WITH REDUCED RESPONSE TIME FOR RECOGNITION

BACKGROUND OF THE INVENTION

The present invention relates generally to a system and a method for recognizing an uttered speech, and particularly, to a speech recognition system and a speech recognition method for responding to a speech signal representative of an uttered speech to recognize the speech as a significant word or a sequence of continuous or discrete significant words, with a reduced response time.

Description of the Related Art

The last decade observed some epochal developments in the speech recognition field, in which a recognition of a speech is implemented by an algorithm to determine one of stored speech references and/or possible combinations thereof, that is most likely the input speech. The algorithm operated based on a distance in a character vector field defined by few tens of character parameters in accordance with an employed mathematical model.

A typical example was a speech recognition method (hereafter "first conventional method") using a dynamic programming (DP) matching algorithm discussed in a paper by H. Sakoe, et al.: "A High Speed DP-Matching Algorithm Based on Frame Synchronization, Beam Search and Vector Quantization" in a paper report book by the Association of Electronic, Information and Communications Engineers of Japan (hereafter "AEICE"), Vol. J71-D No. 9, pp. 1650–1659 (September 1988).

In the first conventional method, an input speech signal is divided into I (I=variable integer) frames, to be analyzed for a conversion into an input pattern A composed of a temporal sequence of frame-mode character vectors $a_j$ (i=1~I), such that:

$$A = a_1, a_2, \ldots, a_j, \ldots, a_I \quad (1).$$

The input pattern A is elementwise compared with a set $\Sigma$ (={$B^n$; n (suffix)=1~N (predetermined integer) }) of N ordered reference words $B^n$ each respectively composed of a basic reference pattern consisting of a sequence of $K^n$ ($K^n$=present integer) frame-mode reference vectors $b^n_k$ (k=1~$K^n$) such that:

$$B^n = b^n_1, b^n_2, \ldots, b^n_k, \ldots, b^n_{K^n} \quad (2),$$

and hence the set $\Sigma$ comprises a collective reference pattern B composed of a sequence of numbered reference vectors $b_j$ (j=1~J; J=total sum of $K^n$ for N words $B^n$), such that:

$$B = b_1, b_2, b_3, \ldots, b_j, \ldots, b_{J1}(=b^1_{K^1}),$$
$$b_{(J1)+1}, b_{(J1)+2}, \ldots, b_{J2}(=b^2_{K^2}), \ldots,$$
$$b_{J(n-1)+1}, b_{J(n-1)+2}, \ldots, b_{Jn}(=b^n_{K^n}), \ldots,$$
$$b_{J(N-2)+1}, b_{J(N-2)+2}, \ldots, b_{J(N-1)},$$
$$b_{J(N-1)}, b_{J(N-1)+2}, \ldots, b_J(=b^N_{K^N}) \quad (3).$$

The comparison follows a DP-matching algorithm to determine N distances $D(A,B^n)$, such that:

$$D(A,B^n) = g(I, K^n) \quad (4),$$

where, $g(I,K^n)$ is a cumulative distance from a word-mode start point (1, j; j=$J_{(n-1)}$+1) to a word-mode end point (I,j; j=$J_n$) by a recurrence formula g(i,j) defined on an i-j plane shown in FIG. 1, e.g. such that:

$$g(i,j) = d(i,j) + \min[G] \quad (5) \text{ for}$$
$$G = \{g(i-1, j), g(i-1, j-1)\} \quad (6),$$

where, d(i,j) is a euclidean distance between vectors $a_i$ and $b_j$, and min[G] means a minimal one in a set G of elements g(i-1,j) and g(i-1, j-1) representative of recursive routes, respectively, providing initial conditions such that:

$$g(1, j; j=J_{(n-1)}+1) = d(1,1) \quad (7),$$
$$g(1, j; j \neq J_{(n-1)}+1) = \infty \quad (8) \text{ and}$$
$$g(i,0) = \infty \quad (9).$$

Typically, the cumulation is continuously repeated via respective trellis points (i,j) in possible routes from an initial point (1,1) to a final point (I,J), as illustrated in FIG. 1 for particular integers p and q. Accordingly, the respective basic reference patterns of words $B^n$ and N distances $D(A,B^n)$ are commonly represented by B and D(A,B) for brevity (See the expression (3)), respectively, which indicate {$B^n$} and g(I,J) also, respectively, as circumstances require. The distinction should be clear for artisans from an associated context.

In a typical calculation, each time when a character vector $a_p$ of any p-th frame is determined, a provisional cumulation g(p,j) is promptly performed for all the J points (p,j) at i=p, before results of the cumulation are stored in a cumulative data memory to permit an immediate recognition after an utterence of a speech.

In that case, for each frame-mode character vector $a_i$ (i=i~I), the cumulative data memory is accessed J times respectively for read and write.

Therefore, for a quick recognition of many words, the cumulative data memory has to be adapted for a high-speed access. In particular, as the set $\Sigma$ of reference words is increased in number (N) of elements, the number (J) of character vectors $b_j$ becomes larger, so that the cumulative data memory is needed to have an increased storage capacity, resulting in an extension of an expensive high-speed memory.

A similar problem was found in other conventional cases, e.g. in a speech recognition method (hereafter "second conventional method") based on a hidden Markov model (HMM) as a probability model discussed at pp. 29–50 of a book by S. Nakagawa: "Speech Recognition by Probability Model" published by the AEICE (July 1988).

For the implementation of recognition in accordance with the HMM, the second conventional method employs some algorithms including a Viterbi algorithm, which has similar processes to the DP-matching algorithm of the first conventional method.

As a solution to such a problem, there has been proposed a speech recognition method (hereafter "third conventional method") in the Japanese Patent Application Laid-Open Publication No. 60-130799.

The third conventional method employs a similar recurrence formula to the first conventional method, for calculating a cumulative value on an i-j plane. Like characters define like terms, for brevity.

FIG. 2 shows the i-j plane in the third conventional method, with a conceptual illustration of a process associated with the calculation in which a cumulation up to J by the recurrence formula is performed, not individually for each i, but collectively over a square block.

As shown in FIG. 2, a certain input pattern length Li is predetermined in terms a number of frames that is a number of character vectors $a_i$. Letting s be a start frame (i=s) of a current cumulation, when a subsequence $\{a_s, a_{s+1}, \ldots, a_{s+Li-1}\}$ of an input pattern A ($=\{a_1, a_2, \ldots, a_I\}$) that corresponds to the length Li is input to the end, a calculation process enters the cumulation to determine a provisional distance g(s+Li, j) for each j (j=1~J) via respective trellis points (i,j) between i=s and i=s+Li−1, so that a square block Li×J is covered by the current cumulation, before a subsequent cumulation starts from a frame i=s+Li.

More specifically, the third conventional method employs a cumulative data memory with an adequate capacity for a set of J cumulative data and a work memory with an adequate capacity for a cumulation along Li frames.

In the cumulation over the block Li×J, the cumulative data memory first receives an access for reading therefrom a provisional distance g(s−1, q) for j=q. The read distance g(s−1, q) is processed for a calculation to determine a first recursive distance g(s, q), which is stored in the work memory and read therefrom to be processed for a calculation to determine a second recursive distance g(s+1, q). Like this, a recursive distance g(i,q) is determined every trellis point (i,q) between from i=s to i=s +Li−1, while associated results {g(i,q)} are stored in the work memory. Then, from a distance g(s+Li−1, q), there is determined a final recursive distance g(s+Li, q), which is written as an updated provisional distance in the cumulative data memory.

The foregoing cumulation process is repeated every j from 1 to J.

Accordingly, for each j, the cumulative data memory is accessed no more than once respectively for read and write, while the work memory is accessed Li−1 times respectively for read and write.

In other words, the third conventional method divides an input pattern A into frame blocks each consisting of Li frames that inherently require for each i a total of Li accesses respectively for read and write to a certain memory, and shares out simply one of them to a cumulative data memory and all of the rest to a work memory, thereby permitting a speech recognition to be achieved in a short time with a reduced scale of an expensive high-speed memory, in comparison with the first conventional method.

For example, supposing that J=10,000 (10 frames/word× 1,000 words) and Li=100 (frames), if a high-speed memory of 99 words/sec. is used as a work memory for Li−1=99 (accesses respectively for read and write), then even a memory of a speed 10 times slower than the work memory can be used as a cumulative data memory with an increase not exceeding a 10% in memory access time. Therefore, a work memory to be a high-speed memory in the third conventional method may have a capacity of about one hundredth relative to a cumulative data memory in the first conventional method.

However, even in the third conventional method, the calculation process is disabled to enter a cumulation over a square block Li×J, before a lapse of a time interval equivalent to an associated frame block (i.e. Li frames) from a start frame s thereof. As a result, for a cumulation over a last block hatched in FIG. 2, a series of necessary calculation steps are to be executed after an utterence of a speech is over.

For example, supposing that a unit i=10 msec. and Li=100, a delay of approx. 1 sec. is needed to obtain a result of recognition, relative to a real-time calculation, i.e., from the end of the utterence.

Such conventional methods thus have a problem that a recognition is subjected to a long response time due to a collective post-cumulation of a frame block of speech.

To render short such the response time, an expensive high-speed memory must be scaled up.

The present invention has been achieved with such points in mind.

SUMMARY OF THE INVENTION

It is therefore an object of the present invention to provide a speech recognition system and a speech recognition method permitting a response time for a speech recognition to be effectively reduced without increasing a capacity of an expensive high-speed memory.

To achieve the object, a genus of the present invention provides a speech recognition system for recognizing an input speech by determining a cumulative distance thereof relative to a reference pattern. The speech recognition system comprises analysis means for dividing the input speech into a number of frames of a predetermined length and analyzing the frames to determine an input pattern composed of a temporal sequence of input pattern elements representative of characters of the frames, distance calculation means for sequentially calculating a set of euclidean distances between the input pattern elements and respective pattern elements of the reference pattern predetermined to be stored, work memory means for temporarily storing cumulative values of the euclidean distances in a corresponding manner to predetermined ones of the frames of the input pattern, cumulative data memory means for storing a final cumulative value of each block of the frames of the input pattern, recurrence calculation means for accessing stored data in the work memory means and stored data in the cumulative data memory means, processing the data to calculate the cumulative values, and using the cumulative values to update the stored data in the cumulative data memory means, decision means for using the updated data to make a decision for the recognition of the input speech and outputting a result of the decision; and work memory shifter means for shifting the stored data in the work memory means by a predetermined shift when the stored data in the cumulative data memory means are updated.

According to a species of the genus of the invention, the distance calculation means processes a plurality of input patterns and a plurality of reference patterns to concurrently calculate a plurality of euclidean distances.

Moreover, to achieve the object, another genus of the present invention provides a speech recognition method for recognizing an input speech by determining a cumulative distance thereof relative to a reference pattern. The speech recognition method comprises the steps of dividing the input speech into a number of frames of a predetermined length and analyzing the frames to determine an input pattern composed of a temporal sequence of input pattern elements representative of characters of the frames, sequentially calculating a set of euclidean distances between the input pattern elements and respective pattern elements of the reference pattern predetermined to be stored, temporarily storing cumulative values of the euclidean distances in a corresponding manner to predetermined ones of the frames of the input pattern, storing a final cumulative value of each block of the frames of the input pattern, accessing stored data in work memory means and stored data in cumulative data memory means, processing the data to calculate the cumulative values, and using the cumulative values to update the stored data in the cumulative data memory means, using the updated data to make a decision for the recognition of the input speech and outputting a result of the decision, and shifting the stored data in the work memory means by a predetermined shift when the stored data in the cumulative data memory means are updated.

According to a species of this genus of the invention, a plurality of input patterns and a plurality of reference patterns are processed to concurrently calculate a plurality of euclidean distances.

Therefore, according to the genera of the invention, a euclidean distance between an input pattern and a reference pattern is determined, and a set of cumulative values thereof is determined by a recurrence calculation, to be used for a speech recognition.

The recurrence calculation is executed over one of division blocks obtained by collecting predetermined numbers of frames respectively in an i-direction and a j-direction. Then, a data shift is performed in the i-direction, in an increasing sense of i, to provide for a recurrence calculation on a subsequent block.

Accordingly, a series of recurrence calculations are executed in parallel with an utterence of a speech, thus resulting in a decreased number of calculation steps remaining at the end of the utterence, permitting a reduced delay before the speech recognition.

Moreover, according to the species of the genera of the invention, a plurality of distance calculations are executed concurrently or in parallel, permitting a decreased number of remaining calculation steps and hence reduced delay.

BRIEF DESCRIPTION OF THE DRAWINGS

The objects, features and advantages of the present invention will become more apparent from consideration of the following detailed description, taken in conjunction with the accompanying drawings, in which:

FIG. 3 is a block diagram of a speech recognition system according to an embodiment of the invention;

DESCRIPTION OF THE PREFERRED EMBODIMENTS

There will be detailed below preferred embodiments of the present invention, with reference to FIGS. 3 to 5. Like items to the foregoing description will be defined by like characters for brevity of description.

FIG. 3 is a block diagram of a speech recognition system according to an embodiment of the invention.

Figure 5:
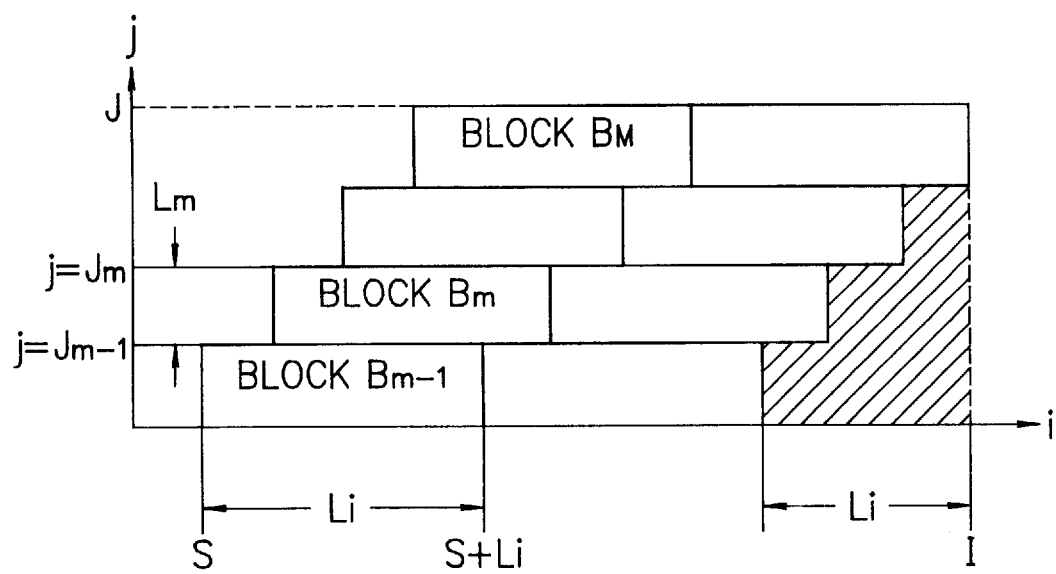
FIG. 5 is a graph of an i-j plane for describing the cumulative calculation in the charts of FIGS. 4A and 4B.

In FIG. 3, designated at reference character 1 is the speech recognition system, in which a division block Bm (=Li×Lm) shown in FIG. 5 is employed as a calculation area for a cumulation, as will be described later. The recognition system 1 comprises an analysis section 2 for performing an analysis of an input acoustic electric signal S1 representative of an uttered speech S0 including a phonetically significant original word W to output a set of results of the analysis as a signal S2, a calculation section 3 for processing the signal S2 to build up J cumulative data Dc representing respective degrees of likelihood of N reference words n to the uttered speech S0, and a decision section 4 for reading the data Dc as a signal S3 to make a decision thereon as to which reference word n is most likely to the speech S0 correspond to thereby recognize the most likely word n as the original word W and for outputting a signal S4 representative of the most likely word n as a result of recognition.

The analysis at the section 2 and the nature of the speech S0 will be limited to phonetic ones for a comprehensive description of the embodiment. It will be seen that they may be extended to cover statistic characters, linguistic characters and/or environmental characters in particular in practical arrangments such as for a long or multi-word speech or conversation. Moreover, in applications such as to a stereosonic speech or an instrumental sound, a temporal derivative character of a first or second order and/or an echo character may be covered.

The analysis section 2 comprises an analyzer 10 for phonetically analysing the input signal S1 by a Mel-scaled Cepstrum analysis, which is known eg. by a book "Digital Speech Processing" by T. Furui, Tokai University Publishing Co., to output an input speech pattern A consisting of a temporal sequence of I character vectors $a_j$ (i=1~I) representative of phonetic characters of the uttered speed S0.

The calculation section 3 comprises a distance calculator 20 provided with a reference pattern memory 30, and a recurrence calculator 40 provided with a cumulative data memory 50, a work memory 60, a work memory shifter 70, a g1 register 80 and a g2 register 90.

The distance calculator 20 calculates a euclidean distance $d(i,j)$ between pattern elements $a_i$ and $b_j$ in a below-described manner.

The reference pattern memory 30 has a reference pattern B (={$b_1, b_2, \ldots, b_j; \ldots, b_J$}) stored therein in advance as a set of objects of recognition.

The cumulative data memory 50 stores a set of final cumulative distances $g(i,j)$ of each division block (Bm in FIG. 5).

The recurrence calculator 40 accesses the memories 50 and 60 to read necessary data, processes the data to perform a recurrence calculation in accordance with the formula (5), and updates the final cumulative distances $g(i,j)$ in the memory 50 by using results of the calculation.

The work memory 60 temporarily stores cumulative distances $g(i,j)$ calculated in a current division block (Bm in FIG. 5).

The work memory shifter 70 shifts the data stored in the work memory 60 in a later-described manner.

The g1 and g2 registers 80 and 90 temporarily hold cumulative distances $g(i,j)$ calculated by the calculator 40.

Functions of the speech recognition system 1 will be described.

Upon reception of each input pattern element $a_i$ (i=1~I), the distance calculator 20 sequentially reads respective elements $b_j$ (j=1~J) of the reference pattern B from the reference pattern memory 30, and calculates a euclidean distance $d(i,j)$ between the input pattern element $a_j$ and a respective one of the reference pattern elements $b_j$ , to serially output a sequence of euclidean distances $d(i,j)$ to the recurrence calculator 40.

Calculations for like elements (i.e. character vectors having the same components) may be collectively executed in a single process to provide a result that may be stored to be read when necessary.

The recurrence calculator 40 cooperates with the cumulative data memory 50, the work memory 60, the work memory shifter 70 and the g1 and g2 registers 80 and 90 to calculate a set of cumulative distances $g(i,j)$ from the sequence of euclidean distances $d(i,j)$ in a following manner having an initial setting process and a calculation process.

Figure 4A:
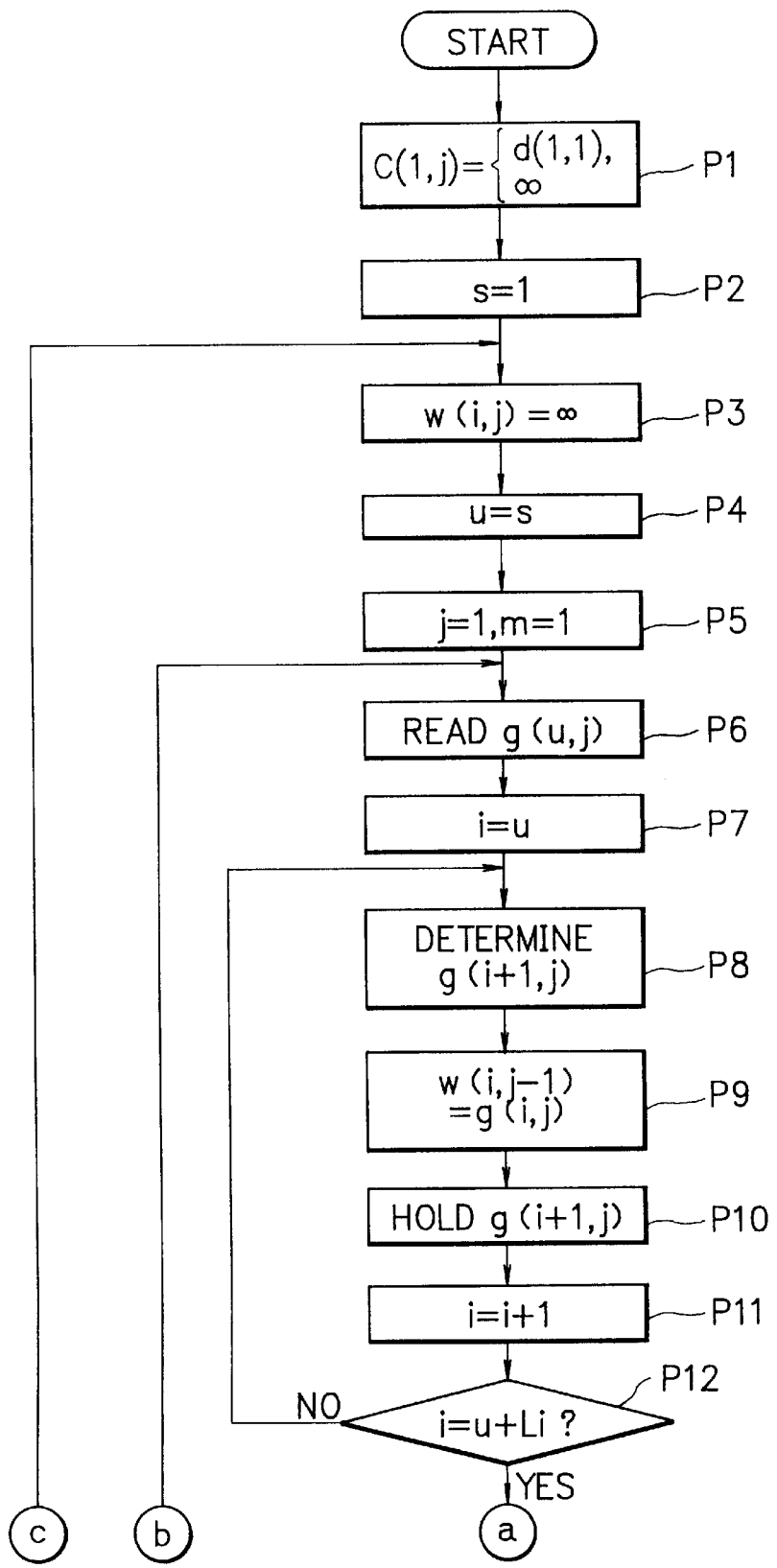
FIGS. 4A and 4B are flow charts of a cumulative calculation according to a speech recognition method employed in the system of FIG. 3.
Figure 4B:
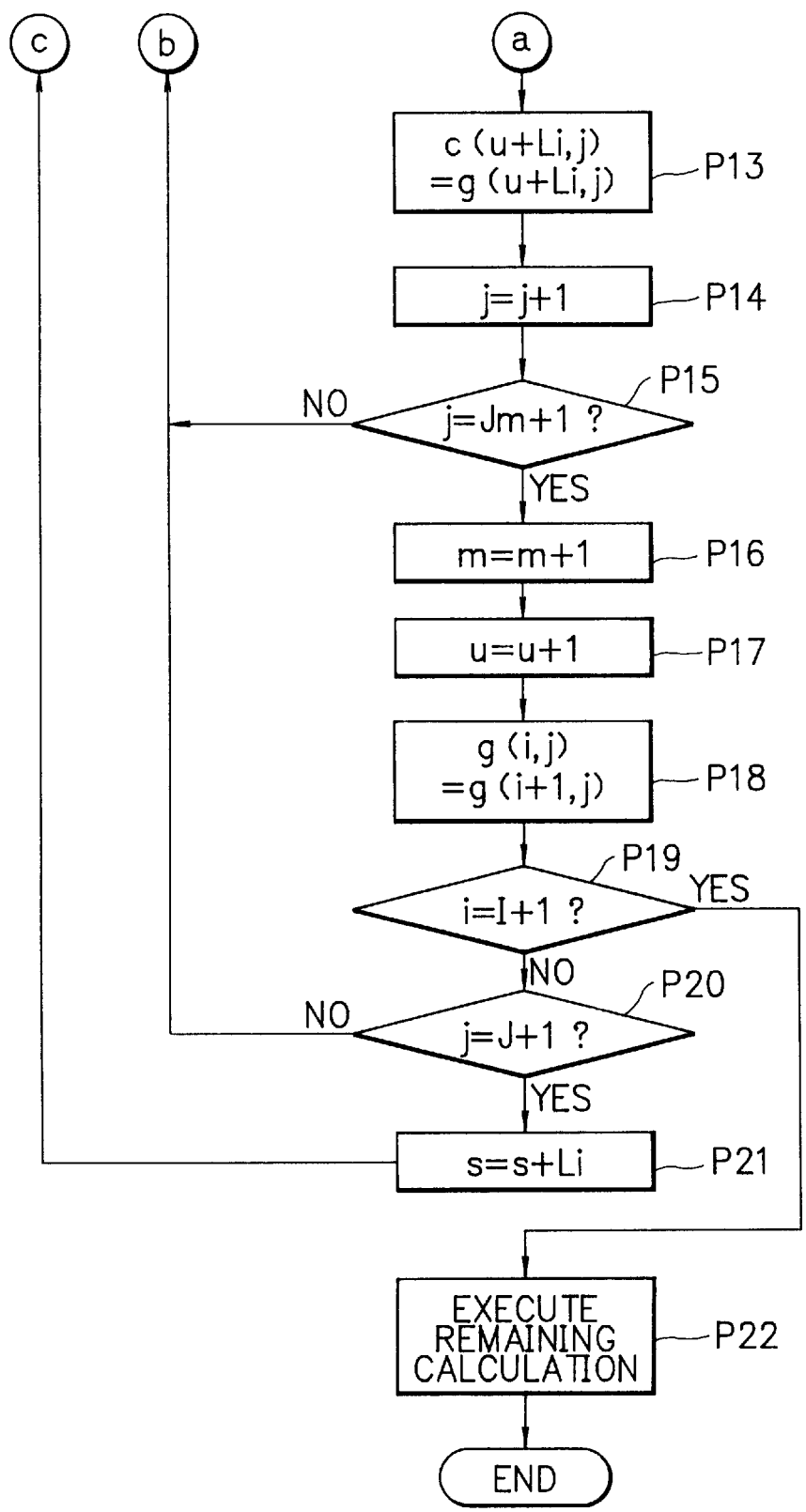

FIGS. 4A and 4B show a flow of associated steps.

Initial setting process

Upon reception of a first euclidean distance $d(1,1)$ from the distance calculator 20, two initial setting steps P1 and P2 are executed as follows.

Step P1: The cumulative data memory 50 is set so that addresses C(i,j) therein for storing cumulative distances g(i,j) have at C(1,j) the euclidean distance d(1,1) or an initial value ∞ in accordance with the expressions (7) and (8).

Step P2: A start frame s of a current frame block (s to s+Li−1) is set for a first frame block between i=1 and i=Li, so that s=1.

Calculation process

Step P3: The work memory 60 is reset so that all addresses W(i,j) therein for storing cumulative distances g(i,j) have an initial value ∞.

Step P4: A start frame u of a current division block (u to u+Li−1) is set for a first division block (m=1), so that u=s.

Step P5: The reference pattern element number j is set to an initial value 1 for the current cumulation. Likewise, a division block number m is set to 1.

Step P6: A cumulative distance g(u,j) is read from the cumulative data memory 50 and held as g(i,j) in the g1 register 80.

Step P7: The input pattern element number i is set to u so that i=u.

Step P8: A euclidean distance d(i+1j) is input from the distance calculator 20. Cumulative distances g(i, j−1) and g(i,j) are read from the work memory 60 and the g1 register 80, respectively. Then, a recurrence calculation is performed in accordance with the formula (5) to obtain a cumulative distance g(i+1, j), which is held in the g2 register 90.

Step P9: The cumulative distance g(i,j) stored in the g1 register 80 is read, and written as a cumulative distance g(i, j−1) in the work memory 60.

Step P10: The cumulative distance g(i+1, j) held in the g2 register 90 is read to be held in the g1 register 80.

Step P11: The input pattern element number i is incremented so that i 32 i+1.

Step P12: A decision is made as to whether or not i (≧u)=u+Li. If i≦u+Li−1, the flow goes to the step P8. When i=u+Li, the flow goes to a subsequent step P13.

Step P13: A cumulative distance g(u+Li, j) is read from the g1 register 80, to be written at an address C(u+Li, j) in the cumulative data memory 50, where a g(u,j) is thus updated to the g(u+Li, j).

Step P14: The reference pattern element number j is incremented to j+1.

Step P15: A decision is made as to whether or not j (>$J_{m-1}$)=$J_m$+1. As shown in FIG. 5, $J_m$ corresponds to a height $L_m$ of each division block $B_m$ (m=1~M; M=J/d, d=number of division blocks). If j<$J_m$ +1, the flow goes to the step P6, for an intra-division block calculation to be repeated $L_m$×Li times in total. When j=$J_m$+1, the flow goes to a subsequent step P16.

Step P16: The division block number m is incremented so that m=m+1.

Step P17: The start frame u of the current division block is incremented so that u=u+1.

Step P18: The work memory shifter 70 shifts a cumulative distance g(i,j) stored at each address W(i,j) in the work memory 60 to a neighboring address W(i−1,j), so that at each W(i,j) the g(i,j) is updated to a g(i+1,j), whereby a cumulation area is shifted from a current division block $B_m$ to a subsequent division block $B_{m+1}$. The same effect may be obtained by generating a shifted address signal.

Step P19: A decision is made as to whether or not the input pattern element number i (≧s)=I+1. If i<I+1, the flow goes to a subsequent step P20. When i=I+1, the flow goes to a later-described step P22.

Step P20: A decision is made as to whether or not j (>$B_{m-1}$)=J+1. If j<J+1, the flow goes to the step P6. When j=J+1, the flow goes to a subsequent step P21.

Step P21: The start frame s of the current frame block is incremented so that s=s+Li, before the flow goes to the step P3.

Step P22: Upon reception of a final frame, necessary calculations are executed in accordance with the formula (5) to determine a number of remaining distances.

The decision section 4 employs a cumulative distance g(i,j) stored at an address C(i,j) of the cumulative data memory 50 corresponding to an end element of reference pattern of a respective one n (n=1~N) of N words, to make a decision as to which reference word n is most likely to the input pattern A in terms of a cumulative distance associated therewith, and recognizes the uttered speech S0 as the most likely word n, of which a result is output as a signal S4.

Figure 1:
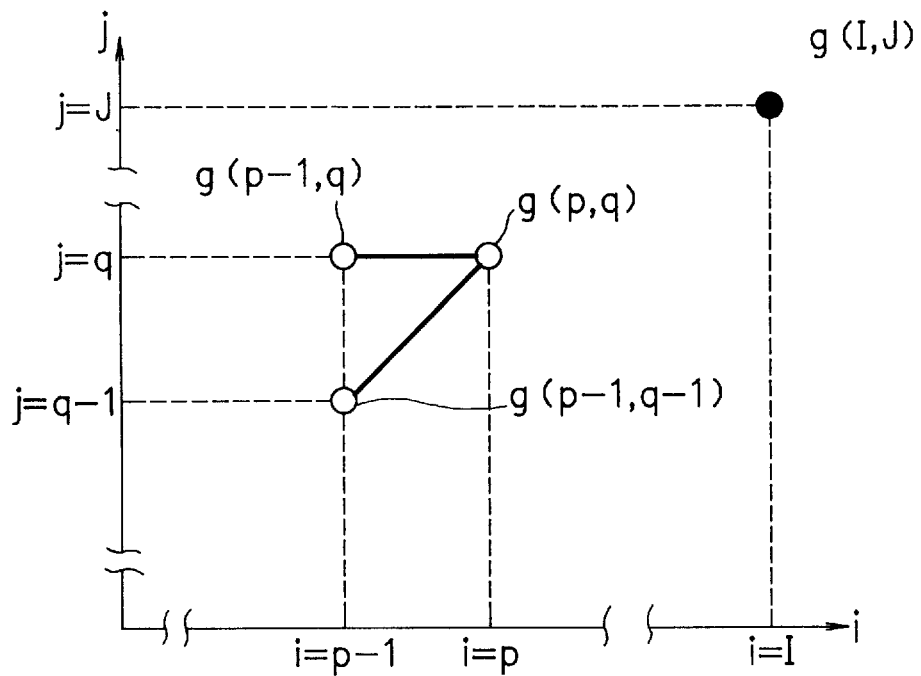
FIG. 1 is a graph of an i-j plane for describing a conventional speech recognition method.
Figure 2:
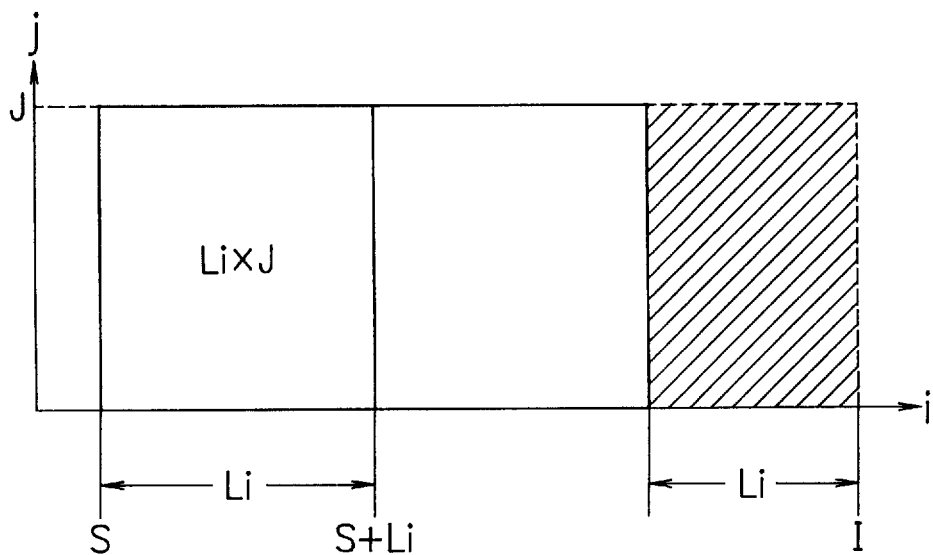
FIG. 2 is graph of an i-j plane for describing another conventional speech recognition method.

As shown in FIG. 5, when an utterance of a speech is ended, the remaining calculations correspond to trellis points (i,j) in a hatched area, which is substantially one half of the hatched area in FIG. 2 showing the third conventional method.

For example, supposing that a unit i=10 msec. and Li=100, the delay from a real-time calculation is reduced from the conventional 1 sec. to a 0.5 sec. in the present embodiment.

The foregoing description of recurrence calculation is based on a DP-matching algorithm according to the first conventional method.

To this point, a similar effect is available in an application of the embodiment to a recurrence calculation according to the second conventional method, providing that a recurrence formula, which may be different from the formula (5) as it conforms to the HMM, is calculated by similar steps to the embodiment, and that a similar system to FIG. 3 is employed.

The embodiment may be modified for a calculation of a cumulative distance g(i,j), such that all euclidean distances d(i,j) between respective pattern elements $a_i$ and $b_j$ are calculated and stored in advance to be read as necessary for a recurrence calculation, that an input pattern A is held to be partially read as necessary for a calculation of a euclidean distance d(i,j) for a recurrence calculation, and/or that a primitive distance is calculated and stored in advance to be synthesized with a euclidean distance d(i,j) in a recurrence calculation.

Moreover, the embodiment in which reference pattern elements $b_j$ are counted one by one may be modified so that a number of continuous pattern elements $b_j$ are employed in parallel for a collective recurrence calculation, or that a plurality of input patterns and a plurality of reference patterns are processed to concurrently calculate a plurality of euclidean distances.

Further, the cumulative data memory 50 may preferably comprise a one-dimensional storage area C(k:k=1~J). Likewise, the work memory 60 may preferably comprise a one-dimensional storage area W(k:k=1~Li).

Still more, the cumulation in a current division block $B_m$ may be performed along a i-direction, before an i-direction. In such a case, the work memory 60 may comprise a one-dimensional storage area W(k:k=1~Li+Lm).

Yet more, the distance calculator 20, which calculates a euclidean distance d(i,j) in the embodiment, may calculate any other known distance in a various manner such as by a weighting.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A speech recognition system for recognizing input speech by determining a cumulative distance of the input speech relative to a reference pattern, the speech recognition system comprising:

analysis means for dividing the input speech into a number of frames of a predetermined length and analyzing the frames to determine an input pattern including a temporal sequence of input pattern elements representative of characters of the frames;

distance calculation means for sequentially calculating element distances between each of the input pattern elements and respective predetermined pattern elements of the reference pattern;

work memory means for temporarily storing cumulative values of the element distances, the cumulative values corresponding to a block of a plurality of frames of the input pattern;

cumulative data memory means for storing a final cumulative value of each sub-block of a plurality of frames of the input pattern;

recurrence calculation means for receiving the element distances from the distance calculation means, for accessing the temporarily stored cumulative data in the work memory means and stored data in the cumulative data memory means, for calculating the cumulative values of the element distances based on the received and accessed data, and using the cumulative value to update the stored final cumulative value data in the cumulative data memory means;

decision means for using the final cumulative data of the cumulative data memory means to make a decision for the recognition of the input speech and outputting a result of the decision; and work memory shifter means for shifting the stored data in the work memory means by a predetermined shift when the final cumulative value of a last sub-block of a block of frames is stored in the cumulative data memory means.

2. A speech recognition system according to claim 1, wherein the distance calculation means processes a plurality of input patterns and a plurality of reference patterns to concurrently calculate a plurality of element distances.

3. The speech recognition system of claim 1 wherein said work memory means stores the cumulative values for a block of frames, said block having a first number (Lm) of sub-blocks of frames and said sub-block including a second number (Li) of frames, and wherein said predetermined shift of said work memory shifter means is less than said second number.

4. The speech recognition system of claim 3, wherein the recurrence calculation means updates the final cumulative value stored in the cumulative data memory means after calculating the Li-th cumulative value of the element distance of a sub-block of frames.

5. The speech recognition system of claim 4, wherein said first number is at least 2.

6. A speech recognition method for recognizing input speech by determining a cumulative distance of the input speech relative to a reference pattern, the speech recognition method comprising the steps of:

dividing the input speech into a number of frames of a predetermined length and analyzing the frames to determine an input pattern including a temporal sequence of input pattern elements representative of characters of the frames;

sequentially calculating element distances between the input pattern elements and respective predetermined pattern elements of the reference pattern;

temporarily storing cumulative values of the element distances in a work memory means, the cumulative values corresponding to a block of a plurality of frames of the input pattern;

storing a final cumulative value of each sub-block of frames of the input pattern in a cumulative data memory means;

accessing the temporarily stored cumulative value data in the work memory means and stored final cumulative value data in the cumulative data memory means;

processing the accessed data with the element distances calculated in the sequential calculating step to calculate the cumulative values and using the cumulative values to update the stored final cumulative value data in the cumulative data memory means;

using the final cumulative data of the cumulative data memory means to make a decision for the recognition of the input speech and outputting a result of the decision; and shifting the stored data in the work memory means by a predetermined shift when the final cumulative value of a last sub-block of a block of frames is stored in the cumulative data memory means.

7. A speech recognition method according to claim 6, wherein in said sequentially calculating step, a plurality of input patterns and a plurality of reference patterns are processed to concurrently calculate a plurality of element distances.

8. The speech recognition method of claim 6, wherein said temporarily storing step comprises storing the cumulative values for a block of frames, said block having a first number (Lm) of sub-blocks of frames, and said sub-block including a second number (Li) of frames, and wherein said shifting step, said predetermined shift is less than said second number.

9. The speech recognition method of claim 8, wherein in said step for processing the access data with the calculated element distances, the stored final cumulative values are updated after the Li-th cumulative value of the element distance of a sub-block of frames.

10. The speech recognition method of claim 9, wherein said first number is at least 2.

* * * * *